April 18, 1950     M. H. OLSTAD     2,504,149
EVAPORATIVE HEAT EXCHANGER
Filed Dec. 19, 1946     2 Sheets-Sheet 2
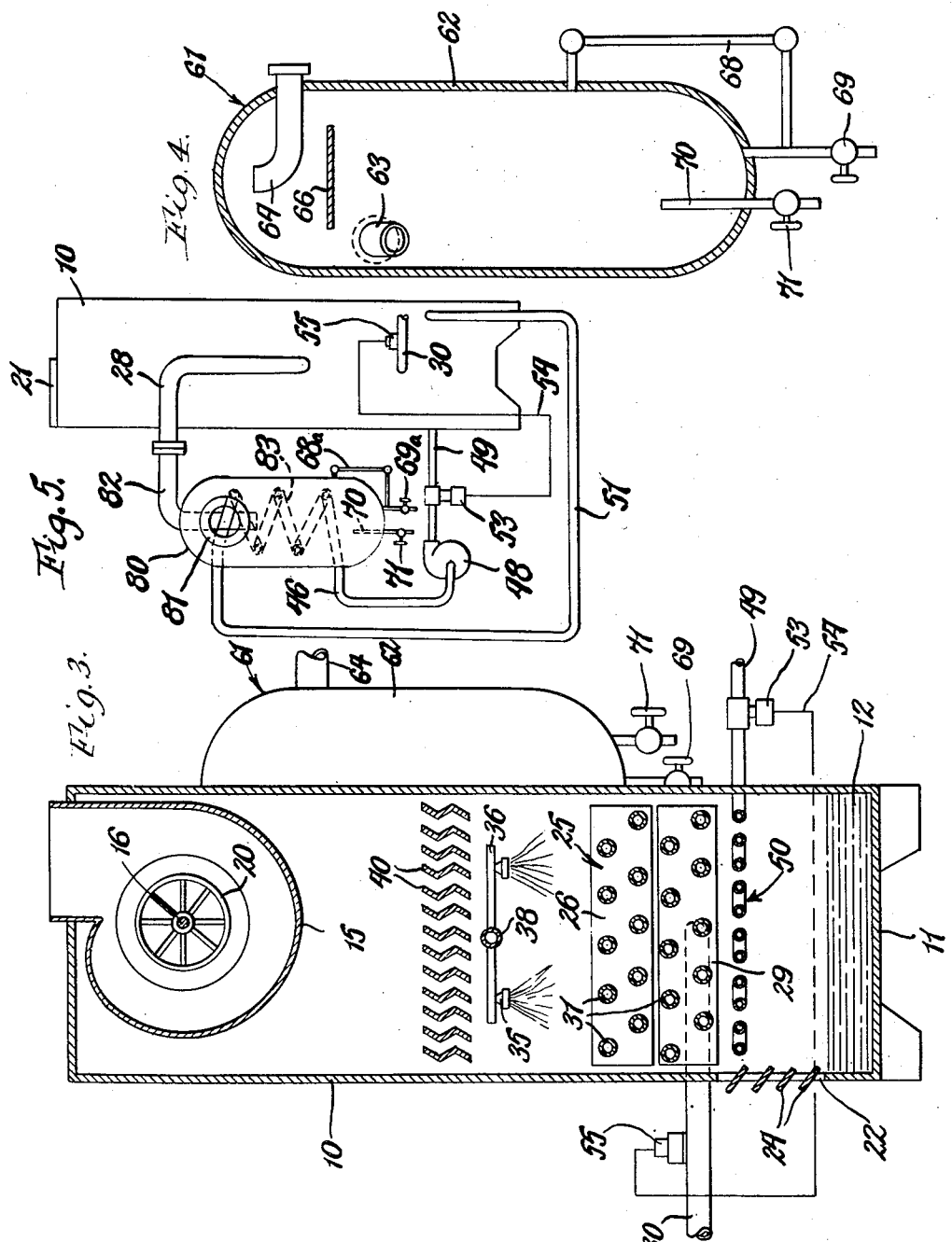
Inventor
Martin H. Olstad
by Popp and Popp
Attorneys Patented Apr. 18, 1950

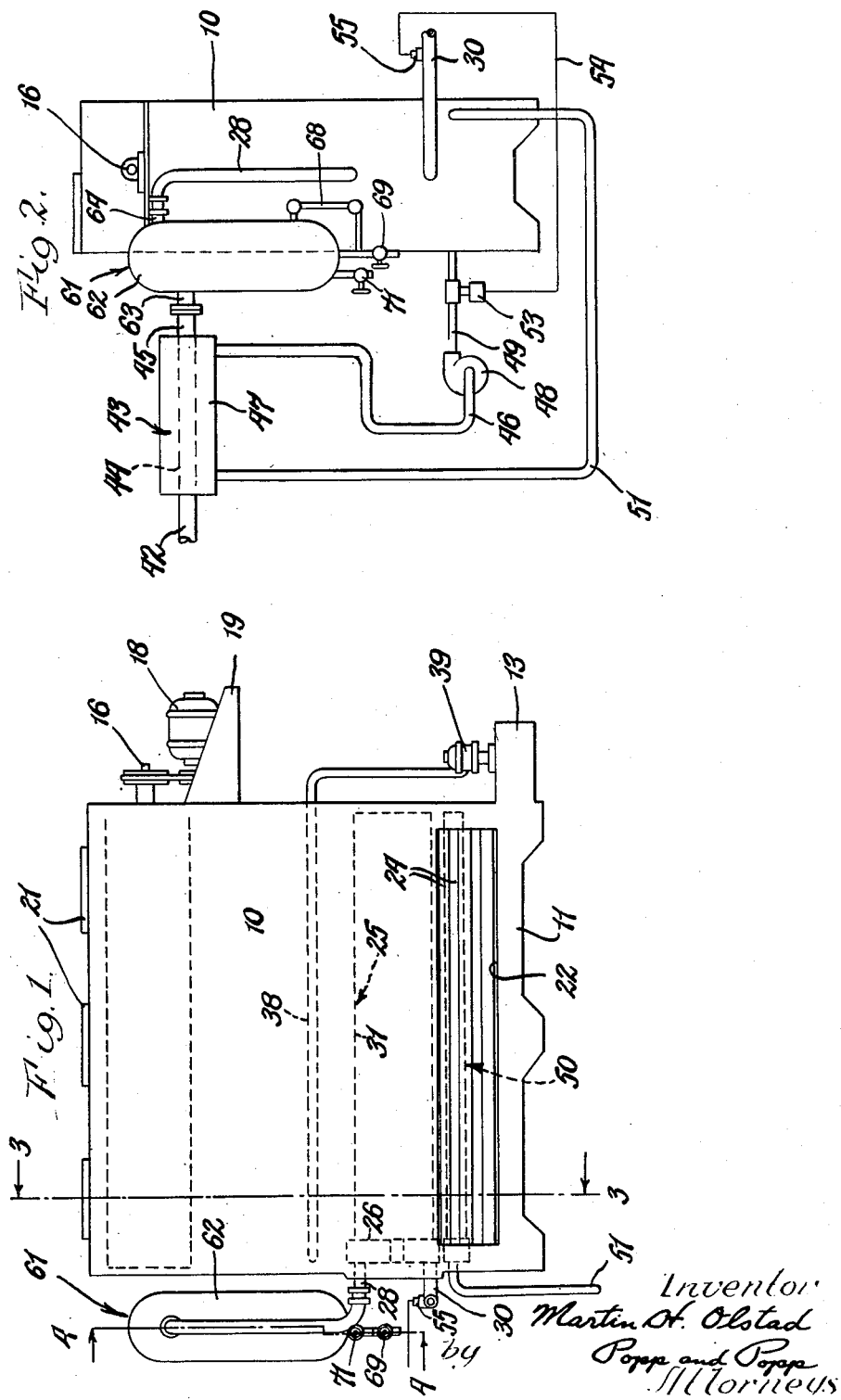

2,504,149

UNITED STATES PATENT OFFICE 2,504,149

EVAPORATIVE HEAT EXCHANGER

Martin H. Olstad, Port Washington, N. Y., assignor to Niagara Blower Company, New York, N. Y., a corporation of New York Application December 19, 1946, Serial No. 717,152

11 Claims. (Cl. 62—3)

This invention relates to an evaporative heat exchanger and is shown as embodied in a condenser for condensing the compressed gas of a refrigeration system, although it can be employed wherever it is desired to cool a gas or liquid to a point near the wet bulb temperature of the atmosphere.

One of the principal objects of this invention is to provide a cooler for cooling and/or condensing a gas or a liquid, such as compressed superheated refrigerant gas, in which the cooling water is recirculated and the cooling effect achieved principally by evaporation of the cooling water on the pipe through which the fluid to be cooled is conducted. By this means an economy is effected in the cost of cooling water.

Another object of the present invention is to provide such a cooler which is suitable for use in cooling fluids having a relatively high entering temperature.

Another object of the present invention is to provide such a condenser in which a first or dry cooling stage merely removes sensible heat from the gas to be condensed to bring it below the point at which a scale would form with evaporative cooling and to remove the balance of the sensible heat and the latent heat in a second stage by evaporative cooling. By this means the preponderance of the heat is removed by evaporative cooling.

Another object is to provide such a heat exchanger in which cooling of both the dry primary coil and the sprayed secondary coil is effected through the evaporation of the same spray water thereby to provide a compact and low cost heat exchanger and also to provide a cooling medium for the primary coil which is below the dry bulb temperature of the atmosphere.

Another object is to provide such a heat exchanger having a dry precooling superheat surface or coil and a sprayed secondary coil for the gas being condensed in which the temperature of the dry precooling superheat coil is automatically adjusted to correspond to the refrigerant pressure to insure precooling close to but not below the condensation temperature of the gas at all operating pressures thereof.

Another object is to provide such an evaporative cooler which has a relatively small amount of cooling coils operating at high efficiency and which is comparatively inexpensive in construction.

Another object is to provide, in combination with such a condenser, means for removing the maximum amount of oil from the fluid being condensed.

A further object is to provide such an oil eliminator in a condenser in which the oil is conveniently available for reuse, Another object is to provide such an oil eliminator which does not have any moving parts other than the necessary valves to remove the oil cooled therein.

Another aim is to provide such an oil eliminator in combination with a condenser, in which the maximum removal of oil from the fluid being condensed under all load and atmospheric conditions can be placed under accurate instrument control.

Another object is to provide such an oil eliminator which is particularly applicable to the non-scaling type of evaporative condenser shown.

Another object of the invention is to provide such an evaporative cooler which is extremely compact in construction and efficient in operation.

Other objects and advantages will appear from the accompanying drawings, in which:

Fig. 1 is a side elevational view of an evaporative heat exchanger embodying the present invention.

Fig. 2 is an end elevational view thereof.

Fig. 3 is a vertical section, taken generally on line 3—3, Fig. 1.

Fig. 4 is a fragmentary vertical section, taken on line 4—4, Fig. 1.

Fig. 5 is a view similar to Fig. 2, showing a modified form of the invention.

In the form of the invention shown in Figs. 1–4 the invention is shown as embodied in a condenser having a sheet metal casing 10 of rectangular form, the bottom of which is closed to form a tank or sump 11 which contains a body of water 12 which is evaporated to provide the cooling effect. The tank 11 is shown as extended beyond one end of the casing, as indicated at 13.

A plurality of fan housings 15 are mounted in the upper part of the casing 10, the inlets of these fan housings being in communication with the interior of the casing 10 so as to exhaust air therefrom. A common shaft 16 extends through the several fan housings 15 and is shown as driven by a motor 18 mounted on a bracket 19 at one end of the casing 10. Within each fan housing the shaft carries a fan wheel 20 of any suitable construction, these fans drawing the air from the interior of the casing 10 and discharging it through outlets 21 which project upwardly through the top of the casing 10. Air is admitted to the lower part of the casing 10 through an inlet 22 in one side wall of the casing, this air inlet being arranged immediately above the body of water 12 and preferably extending substantially the full length of the casing. The inlet 22 is shown as having fixed louvers 24 to prevent the escape of spray water. The principal removal of heat is effected through evaporation and for this purpose an evaporatively cooled condensing coil, indicated generally at 25, is arranged within the casing 10. This evaporatively cooled condensing coil can be of any suitable construction and is shown as comprising an inlet header 26 having an inlet 28 extending through the adjacent end wall of the casing 10, an outlet header 29 having an outlet 30 extending through the same end wall of the casing 10 and a plurality of tubes 31 connecting these headers. To provide evaporative removal of heat from the fluid passing through this evaporatively cooled condensing coil 25, the hairpin tubes 31 of this coil are wetted from overhead spray nozzles 35. These nozzles are shown as mounted on the branches 36 of a longitudinal spray water pipe 38 which extends through the end wall of the casing 10 adjacent to the base extension 13 of this casing. This spray water pipe connects with the outlet of a spray water pump 39 which withdraws water from the body 12 of water in the sump or tank 11 at the bottom of the casing 10. Makeup water can be supplied to this body 12 of water in the sump 11 in any usual and well known manner. The usual eliminator plates 40 are arranged above the sprays 35 to remove entrained water from the air stream.

A feature of the invention resides in the removal of a substantial amount of the sensible heat from the fluid being cooled before being passed through the evaporatively cooled condensing coil 25 in which the preponderance of the removal of heat is effected. This is particularly important where the fluid to be cooled is at a temperature in excess of 115° F. at or above which temperature scale from the spray water deposits on the tubes 31 of the coil 25 and bakes thereon so as to be extremely difficult to remove.

To so reduce the temperature of the fluid to be cooled so that it can be safely passed through the evaporatively cooled condensing coil 25 without danger of forming a hard scale thereon, the compressed gas or other fluid to be cooled is first admitted through the inlet 42 of a heat exchanger 43, which is shown as being a shell and tube heat exchanger with the compressed gas or other fluid passing through the tube or tubes 44 thereof to an outlet 45. The cooling of the hot compressed gases or other fluid passing through this shell and tube heat exchanger 43 is effected by a cooling medium circulated through the shell 47 of this shell and tube heat exchanger around the tubes 44 thereof. The outlet 46 from this shell 47 is shown as connected with the inlet of a pump 48, the outlet line 49 of which connects with the inlet of a cooling coil indicated generally at 50. This cooling coil is shown as arranged within the casing 10 below the coil 25 and above the level of the water 12 and is shown as comprising a serpentine tube having an outlet line 51 connecting with the other end of the shell 47 of the shell and tube heat exchanger 43. It will be seen that a closed circulating system is provided by the shell 47 of the shell and tube heat exchanger 43, line 46, pump 48, line 49, coil 50, and line 51 and preferably distilled water is circulated in this system although an antifreeze medium can be circulated if there is any danger of freezing on shutdown. To permit of expansion and contraction of the distilled water or other liquid circulating in this closed system the usual expansion tank (not shown) can be provided.

The internal surfaces of the tubes 44 of the shell and tube heat exchanger 43 provide a dry primary cooling surface or coil designed to remove only the superheat from the gases to be condensed and to cool these gases to a temperature slightly above the condensing temperature of these gases. To this end a throttling valve 53 is shown as arranged in the line 49 leading from the pump 48 and as controlled, through a line 54 by a pressure control 55 in the outlet line 30 from the secondary evaporative cooling coil 25. By this means, as the head pressure of the refrigerant rises or falls a corresponding adjustment is made of the amount of cooling liquid circulating through the shell 47 of the shell and tube heat exchanger 43 so as to adjust the temperature of the tubes 44 thereof to effect cooling of the gas to a point short of the condensation thereof at the particular head pressure under which the apparatus is operating. These dry primary superheat tubes 44 will thereby remove only the superheat from the gases to be condensed, at all head pressures, and cool them to a temperature slightly above the condensing temperature of these gases. It has been found that the gas at this temperature presents the optimum conditions for the separation of the maximum amount of oil therefrom. To this end the gases leaving this shell and tube heat exchanger 43 are passed through an oil separator indicated generally at 61.

This separator is shown in Fig. 4 as comprising a vertical cylindrical shell 62 having heads at its upper and lower ends. The outlet line 45 from the shell and tube heat exchanger 43 is connected with an inlet pipe 63 extending tangentially through one side of the cylindrical shell 62 and having its discharge end bent downwardly. The pipe 63 thereby provides a downwardly directed tangential inlet so that the entering gas, together with the entrained oil, is induced to travel in a downwardly moving helical path, thereby to set up a rotating and downwardly moving column of gas within the separator shell 62. This gas escapes through an outlet pipe 64 extending through the side wall of the shell 62 near the top thereof. The inlet end of this pipe 64 is bent upwardly and arranged coaxially of the shell 62. Further, to impede the escaping of gas from the separator shell 62, a horizontal baffle 66 is shown as disposed across the center of the separator shell 62, this baffle preventing any tendency of the gas to short circuit from the inlet 63 to the outlet 64. In passing through the separator shell 62 the velocity of the gas is greatly reduced, particularly as the downwardly moving helically rotating column of gas is slowed almost to a standstill before it can escape in a reverse direction to the top of the separator shell. Further the direction of movement of the gas is constantly and abruptly being changed. With such reduction in velocity and change in direction of the air flow, the condensed oil separates from the gas and drops to the bottom of the separator shell 62.

The level of the oil in the bottom of the separator shell 62 can be observed through a sight glass 68. When a sufficient amount of oil accumulates in the separator shell 62, as indicated by the sight glass 68, an oil drain valve 69 in the bottom of the shell 62 can be opened to withdraw the accumulated oil. To drain such ammonia as condenses in the separator shell 62, an ammonia drain pipe 70 is provided in the bottom of the oil separator shell 62, this ammonia drain pipe 70 extending a substantial distance upwardly into the shell and being provided with an ammonia drain valve 71.

From the outlet pipe 64 of the oil separator shell 62, the gas passes into the inlet line 28 of the secondary evaporative cooling coil 25.

In the operation of the form of the invention shown in Figs. 1-4 it will be assumed as an example that the evaporative condenser is used to condense the superheated refrigerant gas from the compressor of a refrigeration system and that this superheated refrigerant gas has a temperature of 210° F. and is under 155 pounds pressure, its condensation temperature therefore being 86° F. It will also be assumed that the wet bulb temperature of the air entering the inlet 22 of the spray chamber is 75° F. The superheated refrigerant gas from the compressor of the refrigeration system enters the tube or tubes 44 of the shell and tube heat exchanger 43 through its inlet 42 and in passing through this shell and tube heat exchanger passes in heat exchange relation with the dry surfaces of the tube or tubes 44 and is precooled thereby. From the outlet 45 of this shell and tube heat exchanger 43 the refrigerant gas passes through the tangential and downwardly directed inlet pipe 63 extending through the cylindrical wall of the shell 62 of the oil separator 61. In traveling through the shell 62 of the oil separator 61 the velocity of the gas is greatly reduced and the direction of its flow changed whereby the entrained oil falls by gravity to the bottom of the separator casing 62. The accumulation of this oil can be removed through the oil drain 69 and any superposed liquid body of the fluid to be condensed can be removed through the drain line 70, the conditions within the separator shell being observable through the sight glass 68. From the outlet 64 of the oil separator the gas passes to the inlet line 28 leading to the secondary coil 25 within the spray chamber formed by the casing 10. In passing through the secondary coil 25 the refrigerant gas is condensed, the condensate passing through the outlet line 30 from the secondary coil.

The secondary coil 25 is cooled by the evaporation of water and for this purpose water is recirculated from the body 12 in the sump 11 by the spray water pump 39 through the spray pipe 38, its branches 36 and the spray nozzles 35. These sprays are directed against the hairpin tubes 31 of the coil 25 and hence discharge and distribute the water on these tubes to evaporate thereon. For such evaporation a stream of air is drawn upwardly through the spray chamber formed by the casing 10 by the fan wheels 20, this air entering at 22 and passing upwardly through the coil 25 and into the fan housings 15, the air being discharged through the outlets 21.

The water from the spray nozzles 35 also washes the exterior of the cooling coil 50 arranged in the spray chamber formed by the casing 10 and is evaporated thereon by the passing stream of air and absorbs heat from this other coil. Distilled water is recirculated through this coil 50 and through the shell 47 of the shell and tube heat exchanger 43 thereby to maintain the desired temperature of the tubes or tube of this shell and tube heat exchanger. This cooling medium can be distilled water or any other suitable medium and is circulated by the pump 48, this cooling medium circulating in a closed system comprising the pump outlet 49, the evaporatively cooled coil 50 in the spray chamber, the line 51, shell 47 of the shell and tube heat exchanger 43 and inlet line 46 to the circulating pump.

By proper proportioning of the coils in the spray chamber provided by the casing 10, it is possible in these wet coils to reduce the temperature of the medium flowing through the same to within 4 to 5° of the wet bulb temperature so that with the assumed outside wet bulb temperature of 75° F. the liquid flowing through these coils can be reduced to 80° F. However, it is desirable to precool the gas flowing through the tube or tubes 44 of the shell and tube heat exchanger 43 to a temperature close to but not below the condensing temperature of the gas which, at the assumed head pressure of 155 pounds, would be 86° F. and which would vary with the varying head pressures of the refrigerating apparatus. Thus, as the head pressure rises or falls, the pressure controller 55 in the condensed refrigerant outlet line 30 adjusts the throttling valve 53 to maintain the correct operating temperature of the cooling medium supplied to the shell and tube heat exchanger 43 under all conditions of refrigerant head pressure.

It will be seen that in passing through the shell and tube heat exchanger 43 substantially all of the superheat of the refrigerant gas is removed, and since the tube or tubes 44 thereof provide a dry interior surface there is no tendency for scale to deposit thereon.

As previously indicated, the shell and tube heat exchanger 43 is proportioned and its cooling medium regulated to remove the superheat from the gas to be condensed and to cool it to a temperature slightly above its condensing temperature. At this temperature it has been found that the maximum amount of oil can be separated from the gas to be condensed. In cooling the gas to be condensed to this temperature slightly above its condensing temperature the oil vapor in the gas is condensed so that it is in liquid form. At the same time the gas to be condensed is still in the form of a gas so that the separation is of a liquid from a gas and not of a liquid from a liquid as would be the case if the temperature of the gas to be condensed were permitted to fall below its condensing temperature.

The gas with the liquid oil entrained therein passes from the outlet 45 of the shell and tube heat exchanger into the oil separator 61. In passing through this oil separator the velocity of the gas is greatly reduced and its direction of flow changed so that the entrained oil falls by gravity to the bottom of the separator casing 62 from which it is removed through the oil drain 69.

It is apparent that the shell and tube heat exchanger 43 and the oil separator 61 of the form of the invention shown in Fig. 1-4 can be combined into a single piece of apparatus. Such a modification of the invention is illustrated in Fig. 5. It will be observed that in this form of the invention shown in Fig. 5, the shell 80 is provided with a gas inlet 81 and also with a gas outlet pipe 82, this outlet pipe extending through the top of the shell 80 and extending downwardly a substantial distance into the interior of the shell and below the level of the inlet 81. In this shell is also arranged a helical coil 83. The oil laden compressed gases to be precooled and thereafter condensed enter the shell 80 through its inlet 81 and leave through its outlet 82, which outlet is connected with the line 28 leading to the cooling coil 25 as in the form of the invention shown in Figs. 1-4. The inlet end of the coil 82 connects with the pipe 51 from the other coil 50 and the outlet end of the coil 82 connects with the line 46 leading to the inlet of the pump 48.

The oil separated from the gas in passing through the shell 80 is removed from the bottom of the shell 80 in the same manner as in the form of the invention shown in Figs. 1-4, and the same reference numerals have therefore been applied and distinguished by the suffix a.

It will be seen that with the form of the invention shown in Fig. 5 the operation is identical with that shown in Figs. 1-4, except that the heat exchanger 43 and oil separator 61 have been combined into one piece of apparatus in which both the precooling of the gas to a temperature close to but above its condensation point and the removal of the entrained oil therefrom takes place. Thus, the pump 48 constantly recirculates a cooling medium, such as distilled water, through the line 49, evaporatively cooled coil 50, line 51, and cooling coil 83 back through the line 46 to the inlet of the pump 48. This distilled water or the like is cooled on passing through the cooling coil 50 by the evaporation of the spray water thereon and the temperature of this distilled water supplied to the coil 83 is maintained to correspond with the head pressure by the pressure control 55 in the outlet line 30 which actuates the throttling valve 53 in the pump outlet line 49. These instruments are set to maintain the temperature of the dry external surfaces of the coil 83 at that necessary to insure that the hot compressed gas passing through the shell 80 is cooled to a temperature just above its condensation temperature.

At the same time, the gas entering the inlet 81 is reduced in velocity in its passage through the shell 80 and also is required to take a circuitous path therethrough by reason of the arrangement of the inlet 81 and the outlet 82. Accordingly, oil separation takes place in the shell 80, this oil being removed through the oil outlet valve 69a in the same manner as with the form of the invention shown in Figs. 1-4. The hot compressed gas is therefore cooled to the most favorable temperature for oil separation and at the same time is precooled so as to avoid overheating and scale formation on the tubes 31 of the sprayed coil 25 in which the gas is condensed.

From the foregoing it will be seen that the features of the invention are accomplished with very simple apparatus and which will function at high efficiency without getting out of order or adjustment.

I claim as my invention:

1. A cooler of the character described, comprising a heat exchanger having a dry precooling surface, means forming a chamber, means for forcing a current of air through said chamber, a coil in the path of the current of air when passing through said chamber, means for discharging and distributing water over said coil to wash the exterior of said cooling coil and to evaporate thereon and absorb heat therefrom, means below said coil for collecting the water, means for recirculating the collected water through said discharging means, means for circulating the fluid to be cooled in series over said dry precooling surface and through said coil, and means for circulating a cooling fluid through said heat exchanger.

2. A condenser of the character described, comprising a heat exchanger having a dry cooling surface, means forming a chamber, means for forcing a current of air through said chamber, a coil in the path of the current of air when passing through said chamber, means for discharging and distributing water over said coil to wash the exterior of said cooling coil and to evaporate thereon and absorb heat therefrom, means below said coil for collecting the water, means for recirculating the collected water through said discharging means, means for circulating the gas to be condensed in series over said dry precooling surface and through said coil, means for circulating a cooling fluid through said heat exchanger and means regulating the temperature of said cooling fluid to said heat exchanger to precool said gas to a temperature slightly above the condensation temperature thereof.

3. A cooler of the character described, comprising means forming a precooling chamber, a dry precooling coil arranged in said precooling chamber, means forming a secondary chamber, means for forcing a current of air through said secondary chamber, a secondary coil in the path of the current of air when passing through said secondary chamber, means for discharging and distributing water over said secondary coil to wash the exterior of said secondary coil and to evaporate thereon and absorb heat therefrom, means below said secondary coil for collecting the water, means for recirculating the collected water through said discharging means, means for circulating the fluid to be cooled in series through said primary chamber and through said secondary coil, and means for circulating a cooling fluid through said precooling coil.

4. A cooler of the character described, comprising means forming a precooling chamber, a dry precooling coil arranged in said precooling chamber, means forming a secondary chamber, means for forcing a current of air through said secondary chamber, a secondary coil in the path of the current of air when passing through said secondary chamber, means for discharging and distributing water over said secondary coil to wash the exterior of said secondary coil and to evaporate thereon and absorb heat therefrom, means below said secondary coil for collecting the water, means for recirculating the collected water through said discharging means, means for circulating the fluid to be cooled in series through said primary chamber and through said secondary coil, means for circulating a cooling fluid through said precooling coil, and means regulating the temperature of said cooling fluid in response to a condition of the fluid to be cooled.

5. A cooler of the character described, comprising a heat exchanger having a dry precooling surface, means forming a chamber, means for forcing a current of air through said chamber, a coil in the path of the current of air when passing through said chamber, means for discharging and distributing water over said coil to wash the exterior of said cooling coil and to evaporate thereon and absorb heat therefrom, means below said coil for collecting the water, means for recirculating the collected water through said discharging means, means for circulating the fluid to be cooled in series first in contact with the said dry pre-cooling surface and then through said coil, means for recirculating a cooling medium through said heat exchanger in heat exchange relation with said dry precooling surface and separate from the fluid to be cooled, and means cooling said cooling medium through the evaporation of said water in said chamber.

6. A cooler of the character described, comprising a heat exchanger having a dry precooling surface, means forming a chamber, means for forcing a current of air through said chamber, a coil in the path of the current of air when passing through said chamber, a cooling coil in the path of the current of air when passing through said chamber, means for discharging and distributing water over both of said coils to wash the exterior of both of said coils and to evaporate thereon and absorb heat therefrom, means below both of said coils for collecting the water, means for recirculating the collected water through said discharging means, means for circulating the fluid to be cooled in series first through said heat exchanger in contact with said dry precooling surface and then through said first mentioned coil, and means for recirculating a cooling medium through said heat exchanger in heat exchange relation with said dry precooling surface and separate from the fluid to be cooled, and through said cooling coil.

7. A cooler of the character described, comprising a heat exchanger having a dry precooling surface, means forming a chamber, means for forcing a current of air through said chamber, a coil in the path of the current of air when passing through said chamber, a cooling coil in the path of the current of air when passing through said chamber, means for discharging and distributing water over both of said coils to wash the exterior of both of said coils and to evaporate thereon and absorb heat therefrom, means below both of said coils for collecting the water, means for recirculating the collected water through said discharging means, means for circulating the fluid to be cooled in series first through said heat exchanger in contact with said dry precooling surface and then through said first mentioned coil, means for recirculating a cooling medium through said heat exchanger in heat exchange relation with said dry precooling surface and separate from the fluid to be cooled and through said cooling coil, and means regulating the rate of flow of said cooling medium in response to a condition of the fluid to be cooled.

8. A condenser of the character described, comprising a heat exchanger having a dry precooling surface, means for forcing a current of air through said chamber, a coil in the path of the current of air when passing through said chamber, means for discharging and distributing water over said coil to wash the exterior of said coil and to evaporate thereon and absorb heat therefrom, means below said coil for collecting the water, means for recirculating the collected water through said discharging means, means for circulating the gas to be cooled in series first through said heat exchanger in contact with said dry precooling surface and then through said coil, means for recirculating a cooling medium through said heat exchanger in heat exchange relation with said dry precooling surface and separate from the fluid to be cooled, means cooling said cooling medium through the evaporation of said water in said chamber, and means regulating the rate of flow of said cooling medium in response to the head pressure of said gas to precool said gas to a temperature slightly above the condensation temperature thereof.

9. A condenser of the character described, comprising a heat exchanger having a dry precooling surface, means forming a chamber, means for forcing a current of air through said chamber, a coil in the path of the current of air when passing through said chamber, another cooling coil in the path of the current of air when passing through said chamber, means for discharging and distributing water over both of said coils to wash the exterior of both of said coils and to evaporate thereon and absorb heat therefrom, means below both of said coils for collecting the water, means for recirculating the collected water through said discharging means, means for circulating the gas to be condensed in series first through said heat exchanger in contact with said dry precooling surface and then through said first mentioned coil, means for recirculating a cooling medium through said heat exchanger in heat exchange relation with said dry precooling surface and separate from the gas to be condensed and through said cooling coil, and means regulating the rate of flow of said cooling medium in response to the head pressure of said gas to precool said gas to a temperature slightly above the condensation temperature thereof.

10. In a condenser for gases containing a higher boiling point vapor, a heat exchanger having a dry precooling surface, a liquid separator, means forming a chamber, means for forcing a current of air through said chamber, a coil in the path of the current of air when passing through said chamber, means for discharging and distributing water over said coil to wash the exterior of said coil and to evaporate thereon and absorb heat therefrom, means below said coil for collecting the water, means recirculating the collected water through said discharging means, means for circulating the gas to be condensed in series through said heat exchanger in contact with said dry precooling surface, through said liquid separator and then through said coil, and means for circulating a cooling fluid through said heat exchanger to precool said gas to a temperature slightly above the condensation temperature thereof.

11. In a condenser for gases containing a higher boiling point component, a heat exchanger having a dry precooling surface, a liquid separator, means forming a chamber, means for forcing a current of air through said chamber, a coil in the path of the current of air when passing through said chamber, means for discharging and distributing water over said coil to wash the exterior of said coil and to evaporate thereon and absorb heat therefrom, means below said coil for collecting the water, means for recirculating the collected water through said discharging means, means for circulating the gas to be condensed in series first through said heat exchanger in contact with said dry precooling surface, then through said liquid separator and then through said coil, means for recirculating a cooling medium through said heat exchanger in heat exchange relation with said dry precooling surface and separate from the gas cooled thereby, means cooling said cooling medium through the evaporation of said water in said chamber and means regulating the rate of flow of said cooling medium to precool said gas to a temperature slightly above the condensation temperature thereof.

MARTIN H. OLSTAD.

REFERENCES CITED

The following references are of record in the file of this patent:

UNITED STATES PATENTS

| Number | Name | Date |
|---|---|---|
| 2,355,289 | Gibson | Aug. 8, 1944 |